US006940622B1

(12) United States Patent
Weidlich

(10) Patent No.: US 6,940,622 B1
(45) Date of Patent: Sep. 6, 2005

(54) METHOD FOR GENERATING AND EVALUATING A SAMPLE ENGRAVING

(75) Inventor: Ernst-Rudolf Gottfried Weidlich, Kiel (DE)

(73) Assignee: Hell Gravure Systems GmbH, Kiel (DE)

( * ) Notice: Subject to any disclaimer, the term of this patent is extended or adjusted under 35 U.S.C. 154(b) by 0 days.

(21) Appl. No.: 09/744,581

(22) PCT Filed: Jul. 14, 1999

(86) PCT No.: PCT/DE99/02175

§ 371 (c)(1),
(2), (4) Date: Mar. 7, 2001

(87) PCT Pub. No.: WO00/08842

PCT Pub. Date: Feb. 17, 2000

(30) Foreign Application Priority Data

Aug. 5, 1998 (DE) ................................ 198 35 303

(51) Int. Cl.[7] ................................................ H04N 3/40
(52) U.S. Cl. ....................... 358/299; 358/471; 427/145
(58) Field of Search ................................ 358/300, 296, 358/303, 471, 299; 427/145; 700/135, 138

(56) References Cited

U.S. PATENT DOCUMENTS

| | | | | |
|---|---|---|---|---|
| 5,663,802 A | | 9/1997 | Beckett et al. | |
| 6,348,979 B1 | * | 2/2002 | Flannery et al. | 358/1.9 |
| 6,421,576 B1 | * | 7/2002 | Sermund | 700/160 |
| 6,536,672 B1 | * | 3/2003 | Outwater | 235/491 |
| 6,614,558 B1 | * | 9/2003 | Christopher et al. | 358/3.29 |

FOREIGN PATENT DOCUMENTS

| | | | |
|---|---|---|---|
| DE | 197 17 990 A1 | 11/1997 | B41C 1/02 |
| EP | 0 595 324 A1 | 5/1994 | B41C 1/045 |
| WO | WO 94/19900 | 9/1994 | H04N 1/00 |
| WO | WO 95/08443 | 3/1995 | B41C 1/02 |
| WO | WO 96/26837 | 9/1996 | B41C 1/045 |
| WO | WO 96/31349 | 10/1996 | B41C 1/02 |
| WO | WO 96/33870 | 10/1996 | B41C 1/04 |

* cited by examiner

*Primary Examiner*—Jerome Grant, II
(74) *Attorney, Agent, or Firm*—Schiff Hardin LLP

(57) ABSTRACT

In a method for making and evaluating a sample engraving in an electronic engraving machine for engraving printing cylinders for rotogravure, during a sample engraving, trial cups are engraved for predetermined tone values by an engraving element. After the sample engraving, a video camera is positioned at a predetermined axial measuring position, and a video image of the trial cups is recorded. The deviations of position of a measuring point of a selected trial cup are determined from a reference point as position errors $\Delta x_M$, $\Delta y_M$. The position errors $\Delta x_M$, $\Delta y_M$ are then corrected by axially displacing the video camera to a new measuring position and/or by rotating the printing cylinder. Afterwards, the geometric values of the trial cup are measured and are compared with the geometric values of the predetermined tone values. The engraving control signal for guiding the engraving element is calibrated according to the result of the comparison such that the engraved tone values correspond to the predetermined tone values.

30 Claims, 9 Drawing Sheets

METHOD FOR GENERATING AND EVALUATING A SAMPLE ENGRAVING

BACKGROUND OF THE INVENTION

The invention is in the field of electronic reproduction technology and is directed to a method for generating and evaluating a sample engraving in an electronic engraving machine for engraving printing cylinders for rotogravure.

In an electronic engraving machine, an engraving element with an engraving stylus as a cutting tool moves in an axial direction along a rotating printing cylinder. The engraving stylus controlled by an engraving control signal cuts a sequence of cups arranged in an engraving screen into the generated surface of the printing cylinder. The engraving control signal is formed by superimposition of image signal values, which represent the tone values to be engraved between "light" white and "dark" black, with a periodic screen signal. Whereas the screen signal effects a vibrating lifting motion of the engraving stylus for generating the engraving screen, the image signal values determine the geometry values of the cups engraved into the printing cylinder.

The engraving control signal must be calibrated so that the engraved tone values correspond to the hues defined by the image signal values. For that purpose, what is referred to as a sample engraving is implemented before the actual engraving, sample cups for predetermined tone values being engraved into the printing cylinder in this sample engraving.

After the sample engraving, a measuring instrument is positioned on the engraved sample cups and their geometry values such as, for example, the transverse diagonals and longitudinal diagonals are measured.

The measured geometry values of the sample cups are then compared to the predetermined geometry values. Setting values are obtained from the comparison with which the engraving control signal is calibrated such that the geometry values of the cups generated in the later engraving coincide with the geometry values required for reproduction with proper tone values.

The PCT patent application serial number PCT/DE 98/01441 has already disclosed that a video camera with an image evaluation unit be employed for determining the geometry values of engraved sample cups, the geometry values in a video image of the sample cups registered with the video camera being measured with said image evaluation unit.

A prerequisite for an exact measurement is that the sample cups fall completely into the image excerpt registered by the video camera after a manual or automatic positioning of the video camera given optimum image resolution. This condition is not always met in practice, particularly after changing engraving styli, and mismeasurements are the result.

SUMMARY OF THE INVENTION

It is therefore an object of the present invention to improve a method for generating and evaluating a sample engraving in an electronic engraving machine for engraving printing cylinders for rotogravure with respect to the positioning of a measuring instrument, particularly a video camera, such that a high-precision, automatic measuring of the sample cups generated in the sample engraving is assured.

According to the method of the present invention for generating and evaluating a sample cut in an electronic engraving machine for engraving printing cylinders for rotogravure, an engraving control signal for driving an engraving stylus of an engraving element is formed from engraving data which represent tone values to be engraved between "light" and "dark" and a periodic screen signal for generating an engraving screen. With the engraving stylus, a sequence of cups arranged in the engraving screen is engraved into the printing cylinder engraving line by engraving line, geometry values of the cups determining the engraved tone values. Sample cups for predetermined tone values are engraved before actual engraving. A video camera is positioned to a predetermined, axial measurement position and with which a video image of the sample cups is registered. One of the engraved sample cups is selected. A positional deviation of a measurement location of the selected sample cup from a reference location in the video image is identified as a position error. The identified position error is corrected by at least one of axial displacement of the video camera into a new measurement position and by turning the printing cylinder such that the measurement location of the selected sample cup lies at least in a region of the reference location of the video image. Geometry values of at least the selected sample cup are subsequently measured and these geometry values are compared to geometry values of the predetermined tone values. The engraving control signal is calibrated dependent on a result of the comparison such that the engraved tone values correspond to the predetermined tone values.

The invention is explained in greater detail below on the basis of FIGS. 1 through 13.

DESCRIPTION OF THE PREFERRED EMBODIMENTS

Figure 1:
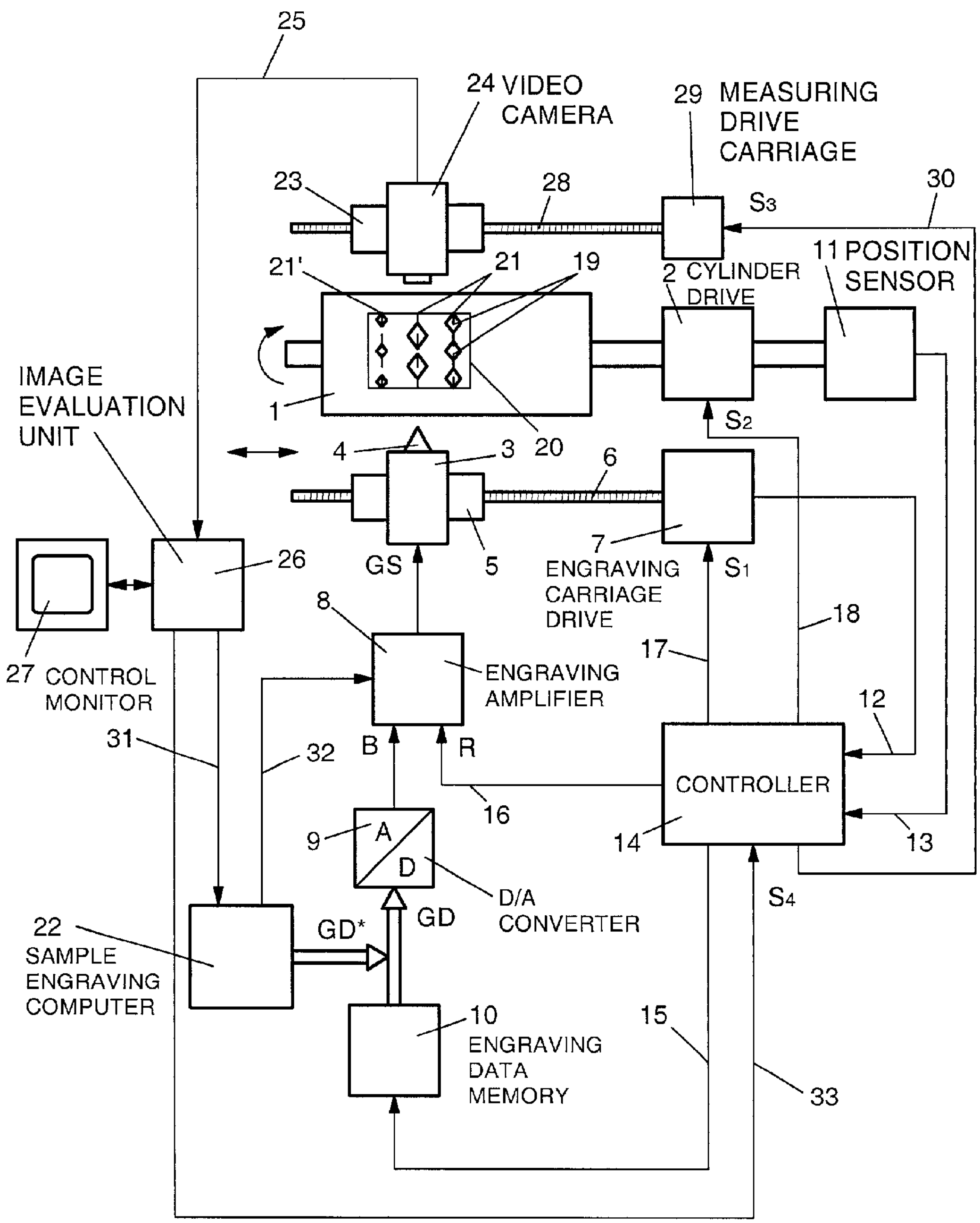
FIG. 1 shows schematically an electronic engraving machine for engraving printing forms with a first exemplary embodiment for the arrangement of a measuring instruments for measuring engraved sample cups.

FIG. 1 schematically shows an electronic engraving machine for engraving printing forms for rotogravure with a first exemplary embodiment for a measuring instrument for measuring sample cups generated in a sample engraving. For example, the engraving machine is a HelioKlischograph® of Hell Gravure Systems GmbH, Kiel, Germany.

A printing cylinder 10 is rotationally driven by a cylinder drive 2. The engraving on the printing cylinder 1 occurs with an engraving element 3 having an engraving stylus 4 as cutting tool. The engraving element 3 is located on an engraving carriage 5 that can be moved in axial direction of the printing cylinder 1 by an engraving carriage drive 7 on the basis of a spindle 6.

The engraving stylus 4 cuts a sequence of cups arranged in an engraving screen into the generated surface of the rotating printing cylinder 1 engraving line by engraving line while the engraving carriage 5 with the engraving element 3 moves along the printing cylinder 1 in the axial direction.

The engraving stylus 4 is controlled by an engraving control signal GS. The engraving control signal GS is formed in an engraving amplifier 8 by superimposition of a periodic screen signal R with image signal values B that represent the tone values of the cups to be engraved between "light" and "dark". Whereas the periodic screen signal R effects a vibrating lifting motion of the engraving stylus 4 for generating the engraving screen, the image signal values B corresponding to the tone values to be engraved determine the geometry values of the engraved cups.

The analog image signal values B are acquired in a D/A converter 9 from engraving data GD that are deposited in an engraving data memory 10 and read therefrom engraving line by engraving line and supplied to the D/A converter 9. Each engraving location in the engraving screen has an engraving datum GD of at least one byte allocated to it that, as engraving information, contains the tone value tone value between "light" and "dark" to be engraved.

The generated surface of the printing cylinder 1 has an engraving coordinate system allocated to it whose abscissa axis is oriented in axial direction of the printing cylinder 1 (feed direction of the engraving element) and whose ordinate axis is oriented in circumferential direction of the printing cylinder 1 (direction of the engraving lines). The engraving coordinates $x_G$ and $y_G$ of the engraving coordinate system define the engraving locations for the cups on the printing cylinder 1. The engraving carriage drive 7 generates the engraving coordinates $x_G$ that determine the axial positions of the engraving lines on the printing cylinder 1. A position sensor 11 mechanically coupled to the cylinder drive 2 generates the corresponding engraving coordinates $y_G$ that indicate the relative circumferential positions of the rotating printing cylinder 1 relative to the engraving stylus 4. The engraving coordinates $x_G$ and $y_G$ of the engraving locations are supplied to a controller 14 via lines 12, 13.

The controller 14 controls the addressing and the readout of the engraving data GD from the engraving data memory 10 dependent on the engraving coordinates $x_G$ and $y_G$ of the current engraving locations via a line 15. The controller 14 also generates the screen signal R on a line 16 with the frequency required for generating the engraving screen. For axial positioning of the engraving element 3 relative to the printing cylinder 1 and for controlling the feed motion of the engraving element 3 during engraving, corresponding control commands $S_1$ on a line 17 to the engraving carriage drive 7 are generated in the controller 14. Further control commands $S_2$ on a line 18 control the cylinder drive 2.

For engraving sample cups 19 on juxtaposed engraving lines 21 in a sample engraving region 20 of the printing cylinder 1 that is not used for the later engraving, the engraving machine comprises a sample engraving computer 22 that supplies the required engraving data GD* to the D/A converter 9.

For measuring the geometry values of the sample cups 19 generated in the sample engraving, a measuring carriage 23 displaceable in the axial direction of the printing cylinder 1 and having a video camera 24 for recording a video image of the sample cups 19, an image evaluation unit 26 connected to the video camera 24 via a line 25 for measuring the registered sample cups 19 and a control monitor 27 for monitoring the video image are present in the first exemplary embodiment shown in FIG. 1.

The geometry values of the sample cups to be measured can, for example, be the transverse diagonals, the longitudinal diagonals, the widths of the pilot cuts and the web widths.

The video image of the sample cups 19 can be made given a stationary printing cylinder 1 or during the rotation of the printing cylinder 1, given a corresponding synchronization. The measuring carriage 23 with the video camera 24 can be axially positioned onto the sample cups 19 generated in the sample engraving region, being positioned with a spindle 28 and a measuring carriage drive 29. The measuring carriage drive 29 is controlled by the controller 140 by control commands $S_3$ on a line 30.

The geometry values of the sample cups 19 measured in the image evaluation unit 26 on the basis of the video image are transmitted to the sample engraving computer 22 via a line 31. Setting values for calibrating the engraving amplifier 8 are acquired in the sample engraving computer 22 by comparing the measured, actual geometry values to the predetermined, rated geometry values. The engraving control signal GS in the engraving amplifier 8 is then calibrated with the setting values, which are supplied to the engraving amplifier 8 via a line 32, such that the cups actually generated in the later engraving of the printing cylinder 1 correspond to the cups required for an engraving with correct tone values.

The calibration of the engraving control signal GS can occur automatically before the engraving or online during the engraving. The calibration, however, can also be manually implemented in that the sample engraving computer 22 merely displays the setting values that have been determined, these then being manually transferred to the engraving amplifier 8.

The generation and evaluation of a sample engraving sequences according to the following method steps:

In a method step [A] for the implementation of the sample engraving, the engraving element 3 with the engraving carriage 5 is axially displaced from a zero position onto a rated position at which the first engraving line 21' is to be engraved within the sample engraving region 20 provided for the sample engraving, being manually or automatically displaced with the engraving carriage drive 7.

In a method step [B], the sample engraving computer 22 calls, for example, the engraving data GD* for the rated tone values "dark", "light" and for at least one "mid-tone value" between "light" and "dark" for engraving the sample cups 19. The engraving data GD* that have been called are converted into the engraving control signal GS for the engraving element 3. Proceeding from the first engraving line 21', the engraving element 3 respectively engraves at least one sample cup 19 for "light", "dark" and "mid-tone value" on juxtaposed engraving lines 21. A plurality of sample cups 19 of the same tone value are preferably engraved in circumferential direction on each engraving line 21, 21' within the expanse of the sample engraving region 20.

In a method step [C], the video camera 24 with the measuring carriage 23 is manually or automatically displaced with the measuring carriage drive 29 from a zero position onto a predetermined measuring position that corresponds to the rated position of that engraving line 21 whose sample cups 19 are to be measured, for example onto the rated position of the first engraving line 21', being displaced for measuring the geometry values of the engraved sample cups 19.

Let the video camera 24 be adjusted such that, given coincidence of the measuring position and the rated position of an engraving line 21, the sample cups 19 of this engraving line to be measured lie on a reference location in the middle of the video image, for example on the ordinate axis of a measurement coordinate system with the coordinate origin in the middle of the image. It is thereby assured that the sample cups 19 are fully covered by the video camera 24 given optimum image resolution in order to achieve a high measuring precision.

In practice, however, the engraving stylus 4 must be occasionally replaced. Without involved readjustment, the original engraving stylus position can be lost when changing engraving styli, and the sample cups 19 are engraved at engraving locations that deviate from the rated engraving locations defined by the engraving coordinate values $x_G$ and $y_G$. In this case, the sample cups 19 are engraved on engraving lines 21, 21' whose axial actual positions are offset compared to the predetermined rated positions. Given displacement of the video camera 24 onto a predetermined measuring position that coincides with a predetermined rated position of an engraving line 21, 21', positive and negative position errors $\Delta x_M$ and $\Delta y_M$ of the sample cups 19 engraved on the offset engraving line 21, 21' compared to the measurement coordinate system therefore appear in the video image. Due to these position errors $\Delta x_M$ and $\Delta y_M$, it can therefore occur that the sample cups 19 do not fully lie in the video image given optimum image resolution, and imprecisions in the measurement of the geometry values of the sample cups are the result.

In order to improve the measuring precision, it is therefore proposed that one of the engraved sample cups 19 be selected, the position errors $\Delta x_M$ and $\Delta y_M$ of the selected sample cup being measured in a method step [D] as coordinate-related distances of a measuring location of the sample cup from a reference location in the video image, for example relative to the coordinate origin of the measurement coordinate system, and the identified position errors $\Delta x_M$ and $\Delta y_M$ are corrected before measuring the geometry values of at least the selected sample cup in a method step [E] by displacing the video camera 24 onto a new measuring position and/or by turning the printing cylinder 1 such that the measuring location of the selected sample cup 19' lies in the reference location of the video image.

In the method step [D], the position errors $\Delta x_M$ and $\Delta y_M$ of the measuring location of the selected sample cup 19' that have arisen in the positioning of the video camera 24 to a predetermined measuring position are first measured relative to the coordinate origin of the measurement coordinate system in the image evaluation unit 26 on the basis of the registered video image.

For example, a sample cup 19 that represents a "mid-tone value" M or, on the other hand, some other sample cup 19 as well should therefore be selected as sample cup 19' whose measuring location is to be shifted into the coordinate origin of the measurement coordinate system. Dependent on which geometry values are to be determined, the mid-point of the cup area, the mid-point of the transverse diagonals or longitudinal diagonals of the sample cup or, on the other hand, the mid-point of a web or pilot cut to be measured should be defined as a measuring location of the selected sample cup 19'. The measurement of the position errors $\Delta x_M$ and $\Delta y_M$ of the selected sample cup in the video image is explained on the basis of FIG. 2.

Figure 2:
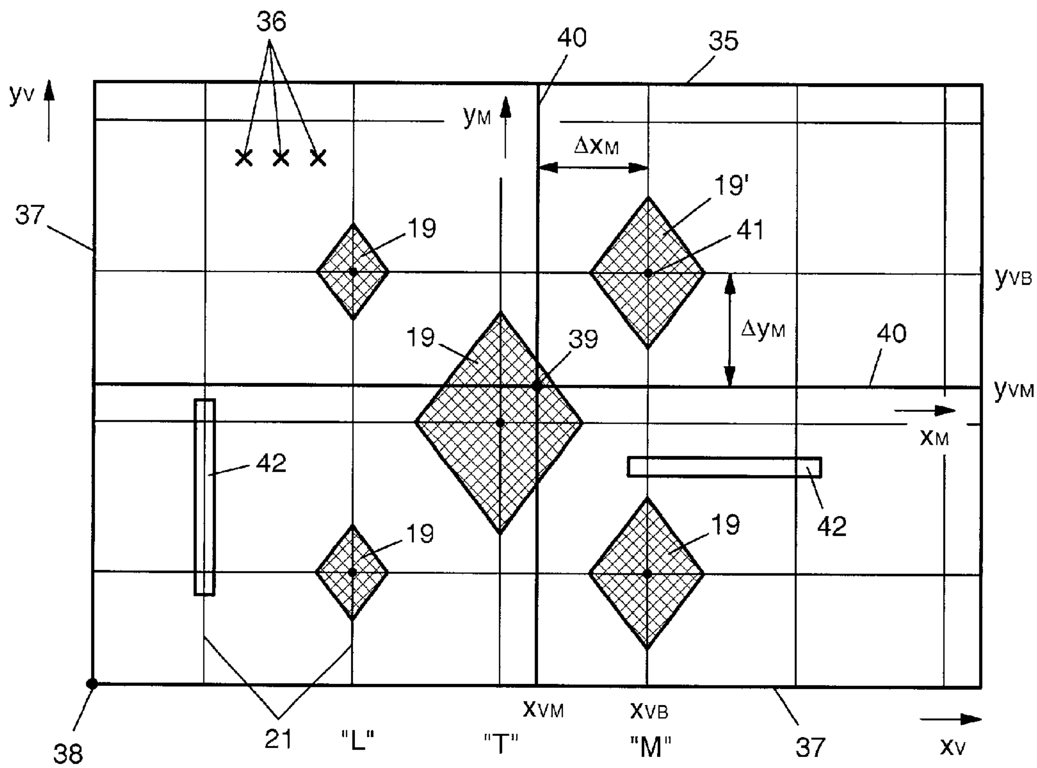
FIG. 2 is a video image of engraved sample cups before correction of positioning errors of a video camera.

FIG. 2 shows a registered video image 35 of the engraved sample cups 19 with the orthogonal engraving screen composed of horizontal and vertical screen lines, whereby the vertical screen lines are the engraving lines 21. For example, engraved sample cups 19 for "light" L, "dark" T and "mid-tone value" M are shown on three juxtaposed engraving lines 21. The centers of gravity of the sample cups 19 lie on the intersections of the screen lines of the engraving screen.

The video image 35 is composed of a plurality of pixels 36 whose positions in the video image 35 are defined by the image coordinates $x_V$ and $y_V$ of an image coordinate system 37 allocated to the video image 35. The coordinate axes of the image coordinate system 37 is directed in the longitudinal and the transverse expanse of the video image 35, and the coordinate origin 36 lies in a corner point of the video image 35. The coordinate axes of the measurement coordinate system 4 are aligned parallel to the coordinate axes of the image coordinate system 37. The coordinate origin 39 of the measurement coordinate system 40, which lies in the mid-point of the video image 35 has the image coordinates $x_{VM}$ and $y_{VM}$ in the image coordinate system 37. The following coordinate-related relationship thus derives:

$$x_M = x_V - x_{VM}$$

$$y_M = y_V - y_{VM}$$

For example, the sample cup 19' with the mid-point of the cup area as measuring location 41 that has the image coordinates $x_{VB}$ and $y_{VB}$ in the image coordinate system 37 is selected. The position errors $\Delta x_M$ and $\Delta y_M$ of the selected sample cup 19' in the measurement coordinate system 40 thus derive as:

$$x_M = x_{VB} - x_{VM}$$

$$y_M = y_{VB} - y_{VM}$$

Every pixel 36 has a video datum VD of, for example, 8 bits characterizing the respective gray scale value allocated to it, so that a total of 254 gray scale values can be distinguished between "black" VD=0 and "white" VD=255. By filtering or with thresholds, the gray scale values can be reduced such to two values that, for example, the video datum VD=0 is allocated to those pixels that fall onto the generated surface of the printing cylinder 1 and the video datum VD=1 is allocated to those pixels that fall onto the cup areas of the sample cup 19. The contour (density discontinuity) of a cup area is thereby characterized by the change of the video datum from "0" to "1" or from "1" to "0".

For automatically determining the image coordinate values $x_{VB}$ and $y_{VB}$ of the measuring location 41 of the selected sample cup 19' in the image coordinate system 37, for example a stripe-shaped measurement field 42 is defined that can be shifted across the video image and that can be aligned with an arbitrary orientation in the image coordinate system 37.

The measurement field 42 is composed of at least one measurement line 43, preferably of a plurality of measurement lines 43 proceeding parallel to one another, and each measurement line 43 comprises a plurality of pixels 36 whose position in the image coordinate system 37 is respectively defined by an image coordinate pair $x_{VMP}$ and $y_{VMP}$, so that the position in the image coordinate system 37 can also be determined for each pixel 36 within the measurement lines 43. The longitudinal expanse of the measurement field 42 amounts to at least the same as the spacing of two engraving lines 21. The spacings of the pixels 36 from one another respectively represent a length increment. By counting the pixels 36 within a measurement distance 44, the length of the measurement distance 44 can thus be measured as a multiple of the length increment.

Figure 3:
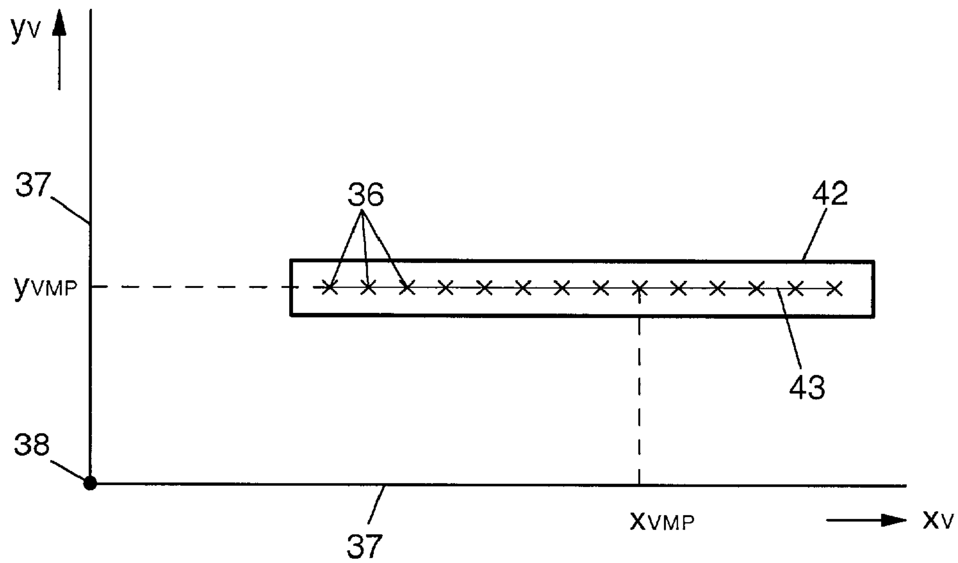
FIG. 3 shows the formation of a stripe-shaped measuring field.

FIG. 3 shows the formation of a stripe-shaped measurement field 42 that, for example, is composed of measurement lines 43 with fourteen pixels 36.

Figure 4:
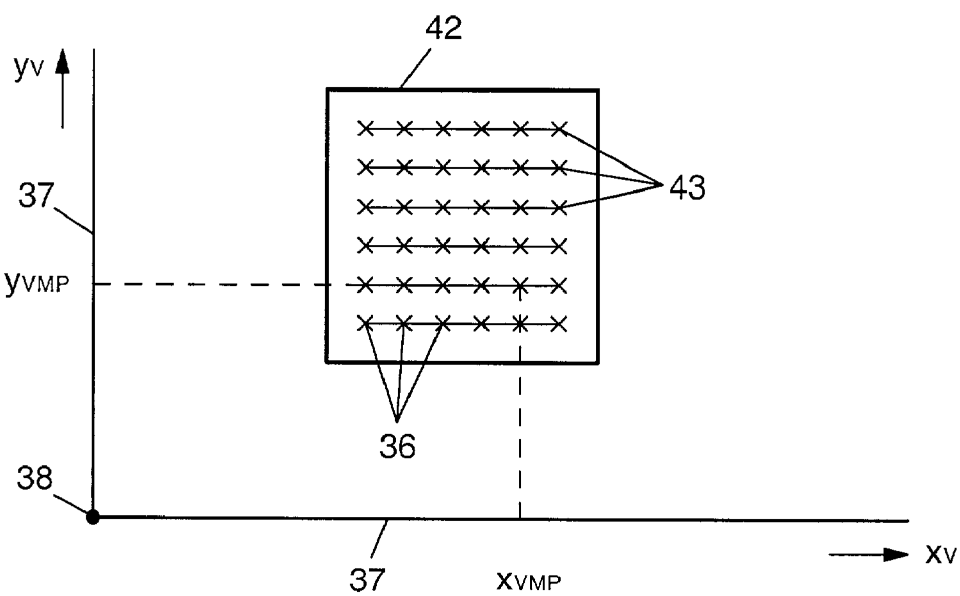
FIG. 4 shows the formation of a quadratic measuring field.

FIG. 4 shows the formation of a quadratic measurement field 42 that, for example, is composed of 6 measurement lines 43 with respectively 6 pixels 36 in each measurement line 43.

As already explained, the edges of the cup area of a sample cup 19 in the registered video image 35 form a contour 45. The measurement distance 44, for example for measuring the maximum transverse diagonal or the maximum longitudinal diagonal of the sample cup 19, thus derives from the respective spacing of the corresponding contours 45 from one another.

The end pixels 36', 36" of the measurement distance 44 are advantageously determined with the assistance of the measurement field 42 itself on the basis of an automatic recognition of two neighboring contours 45, in that the respective video data VD of two successive pixels 36 of the measurement line 43 are investigated for a change of the video data VD.

Figure 5:
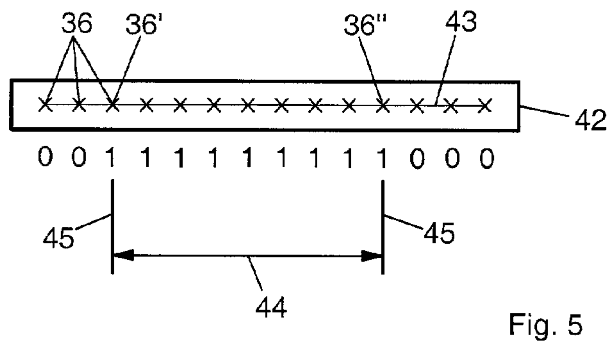
FIG. 5 is a graphic presentation for automatically determining a measuring distance within a measurement field.

FIG. 5 shows the measurement band 42 with one measurement line 43 and two contours 45 spaced from one another. The video data VD allocated to the individual pixels 36 are also shown, whereby the contours 45 are characterized by the change "0" to "1" and "1" to "0". The corresponding end pixels 36', 36" of the measurement distance 44, which is composed of 9 pixels 36 in the illustrated case, are determined by an automatic contour recognition.

Figure 6:
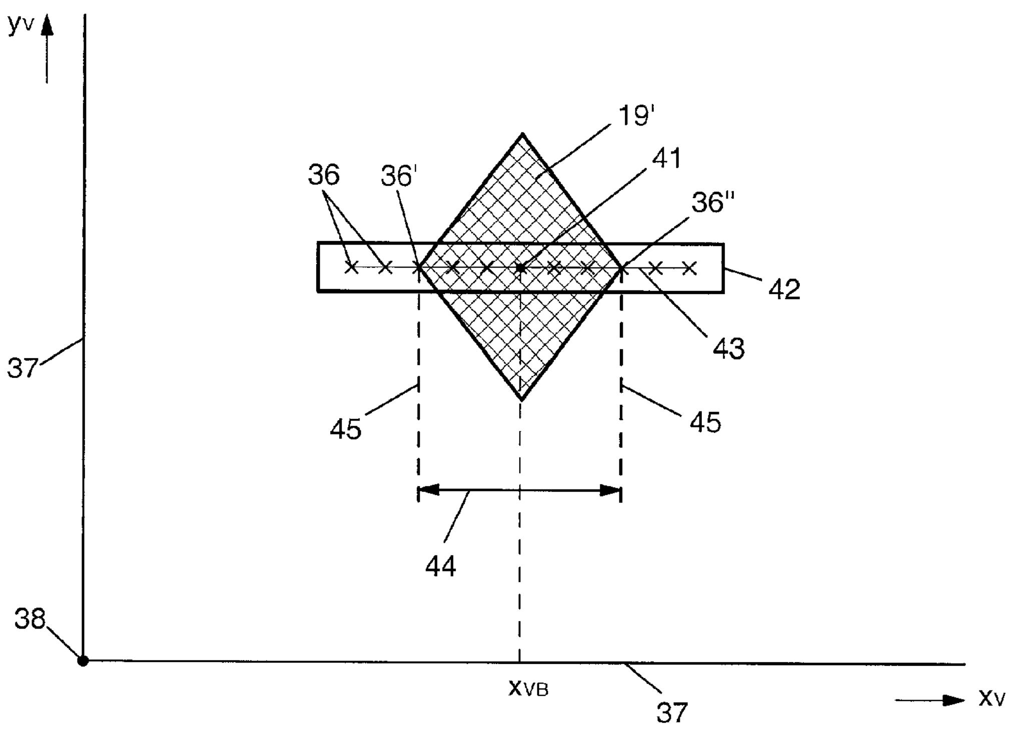
FIG. 6 is a graphic presentation for measuring the positioning errors of a sample cup in one coordinate direction.

FIG. 6 shows the measurement of the image coordinate value $x_{VB}$ of the measurement location 41 of the selected sample cup 19' with the stripe-shaped measurement field 42, which is composed of one measurement line 43. In the illustrated example, the measurement location 41 is the mid-point of the cup area of the selected sample cup 19'. The measurement field 42 has its longitudinal expanse aligned in the direction of the abscissa of the image coordinate system 37 and is shifted onto the selected sample cup 19'. The end pixels 36', 36" of the measurement distance 44 are determined by the automatic recognition of the contour 45 of the cup area of the selected sample cup 19'. The plurality of pixels 36 that devolve onto the measurement distance 44 is thus known, and the middle pixel 360 of the measurement distance 440 then represents the measurement location 41 of the selected sample cup 19'. The image coordinate value $x_{VB}$ of the measurement location 41 of the selected sample cup 19' in the image coordinate system 37 then derives as a coordinate value of the middle pixel of the measurement distance 44.

Figure 7:
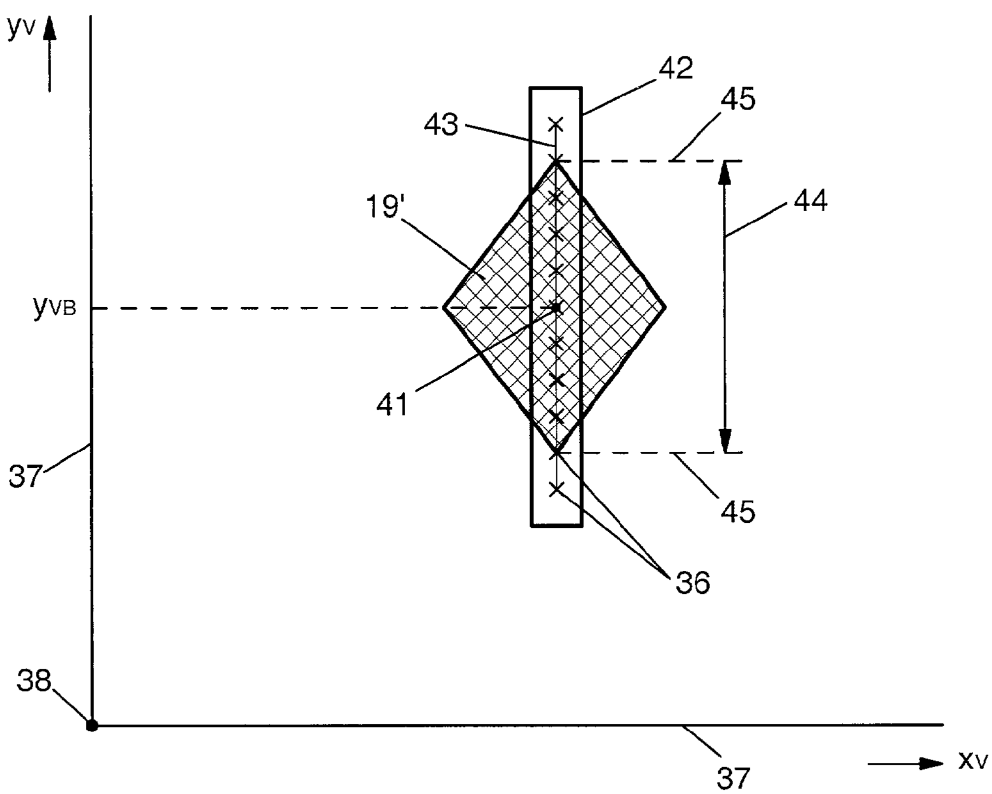
FIG. 7 is a graphic presentation for measuring the positioning errors of a sample cup in the other coordinate direction.

FIG. 7 shows the corresponding measurement of the image coordinate value $y_{VB}$ of the measurement location 41 of the selected sample cup 19' with the measurement field 42 that has its longitudinal expanse aligned in the direction of the ordinate of the image coordinate system 37 for this purpose. In the illustrated example, the measurement location 41 is again the mid-point of the cup area. The image coordinate value $y_{VB}$ of the measurement location 41 of the selected sample cup 19' then derives from the identified coordinate value of the middle pixel 36 of the measurement distance 44.

Advantageously, the selected sample cup 19' that represents a defined tone value is automatically "sought" in the video image 35 with the assistance of a measurement field 42 composed of a plurality of measurement lines 43. For that purpose, the cup area of the sample cup 19' is prescribed according to the predetermined tone value as a plurality of pixels 36. A corresponding measurement field is shown in FIG. 4. The size of the measurement field 42 at least corresponds to the size of the predetermined cup area, so that all pixels 36 falling into the cup area can be covered by the measurement field 42. The measurement field 42 is shifted across the video image 35 from engraving location to engraving location of the sample cups 19. At every engraving location, the cup area of the corresponding sample cup 19 is measured with the assistance of the measurement field 42 in that the pixels 36 counted in the individual measurement lines 43 are added up and compared to the pixel plurality of the predetermined cup area. A sample cup 19 has been identified as selected sample cup 19' when the predetermined and the measured cup area agree.

In a method step [E], the measured position errors $\Delta x_M$ and $\Delta y_M$ are compensated by displacing the measurement carriage 23 and/or by turning the printing cylinder 1. The compensation can ensue manually under visual control of the video image on the control monitor 27 or with an automatic control of cylinder drive 2 and/or engraving carriage drive 7 via the controller 14. The image evaluation unit 23 thereby supplies a corresponding control command $S_4$ to the controller 14 via a line 33 when the evaluation of the video image has yielded that the measurement location 41 of the selected sample cup 19' is congruent with the coordinate origin 38 of the measurement coordinate system 40, as a result whereof an exact determination of the geometry values of the engraved sample cups 19 is assured.

Figure 8:
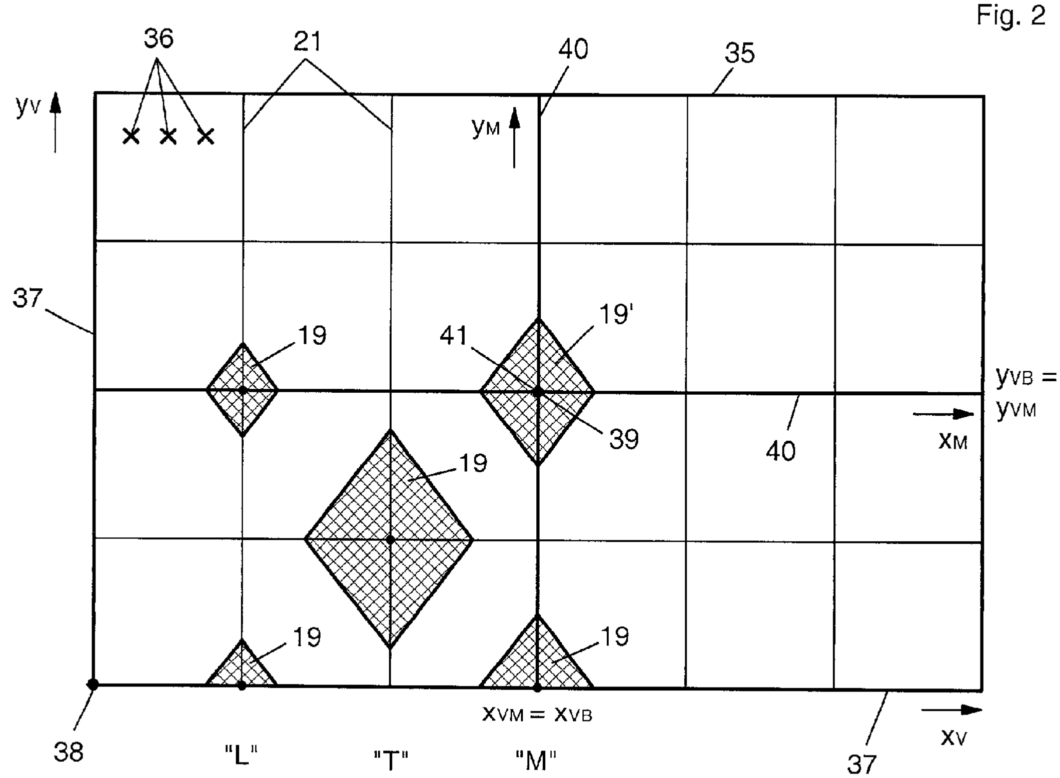
FIG. 8 is a video image of engraved sample cups after a correction of positioning errors of a video camera.

FIG. 8 shows the video image 35 after the correction of the position errors $\Delta x_M$ and $\Delta y_M$. The measurement location 41 of the selected sample cup 19' is now congruent with the coordinate origin 38 of the measurement coordinate system 40 in the video image 35.

In most instances, it suffices to merely compensate the axial position error $\Delta x_M$ by shifting the measurement carriage 23 since a plurality of sample cups 19 for a tone value are usually engraved in engraving line direction and, thus, at least one sample cup 19 of a tone value lies in the pickup area of the video camera 24.

After compensation of the position errors $\Delta x_M$ and $\Delta y_M$, the determination of the geometry values of the engraved sample cups 19 occurs in a method step [F] with an automatic evaluation in the image evaluation unit 26 of the video image 35 according to FIG. 8 registered with the video camera 24. The measurement is advantageously implemented with the assistance of the same measurement field 42 that was already employed for the measurement of the position errors $\Delta x_M$ and $\Delta y_M$.

For measuring the maximum transverse diagonal $d_{Qmax}$, which corresponds to the measurement distance 44 in FIG.

6, or an arbitrary transverse diagonal $d_Q$ of a sample cup 19, the measurement field—as already shown in FIG. 6—has its longitudinal expanse aligned in the direction of the abscissa of the measurement coordinate system 40.

For measuring the maximum longitudinal diagonal $d_{Lmax}$, which corresponds to the measurement distance in FIG. 7, or an arbitrary longitudinal diagonal $d_L$ of a sample cup 19, the measurement field 42—as shown in FIG. 7—has its longitudinal expanse aligned in the direction of the ordinate of the measurement coordinate system 40.

Figure 9:
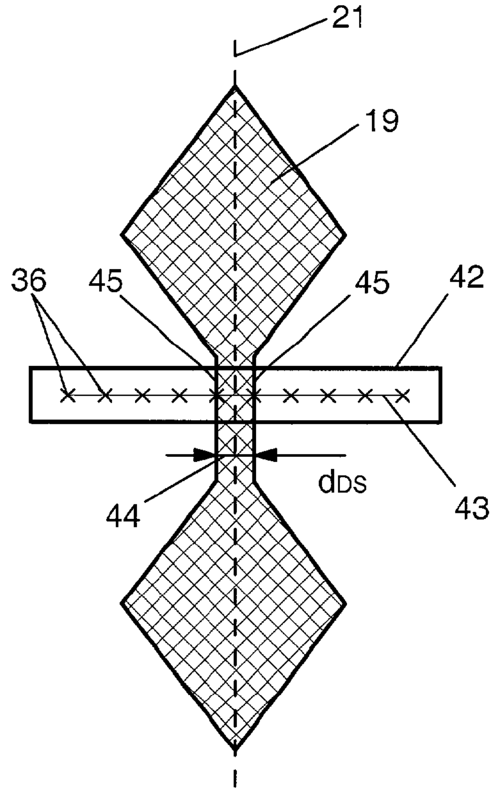
FIG. 9 is a graphic presentation for measuring a pilot cut.

For measuring the pilot cut $d_{DS}$, i.e. the width of the engraving channel in the direction of the abscissa of the measurement coordinate system 40 that connects two sample cups 19 engraved on an engraving line 21, the measurement field 42 again has its longitudinal expanse aligned in the direction of the abscissa. The measurement of the pilot cut $d_{DS}$ is graphically shown in FIG. 9.

Figure 10:
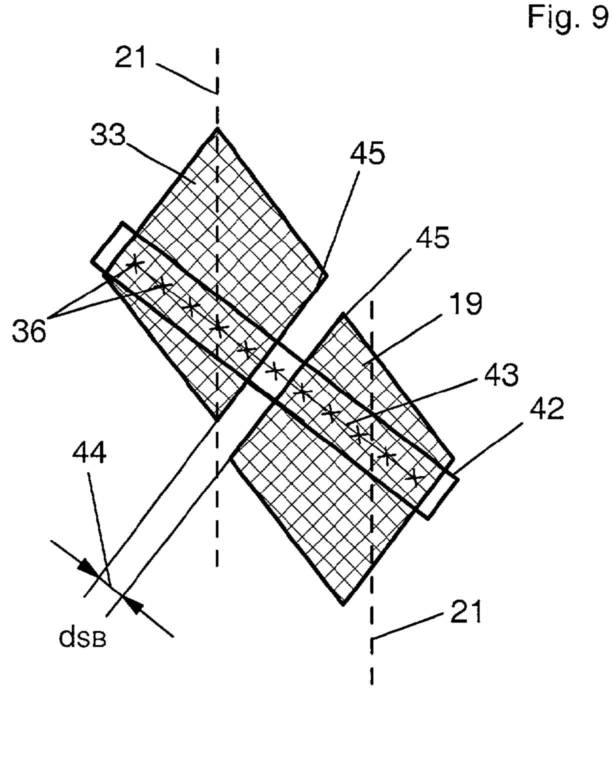
FIG. 10 is a graphic presentation for measuring a web width.

For measuring the web width $d_{SB}$, i.e. the width of the material that has remained standing between two deep cups engraved on neighboring engraving lines 21, 21', the measurement field is expediently turned such that it has its longitudinal expanse aligned approximately perpendicularly to the course of the web. The measurement of the web width $d_{SB}$ is graphically shown in FIG. 10.

Figure 11:
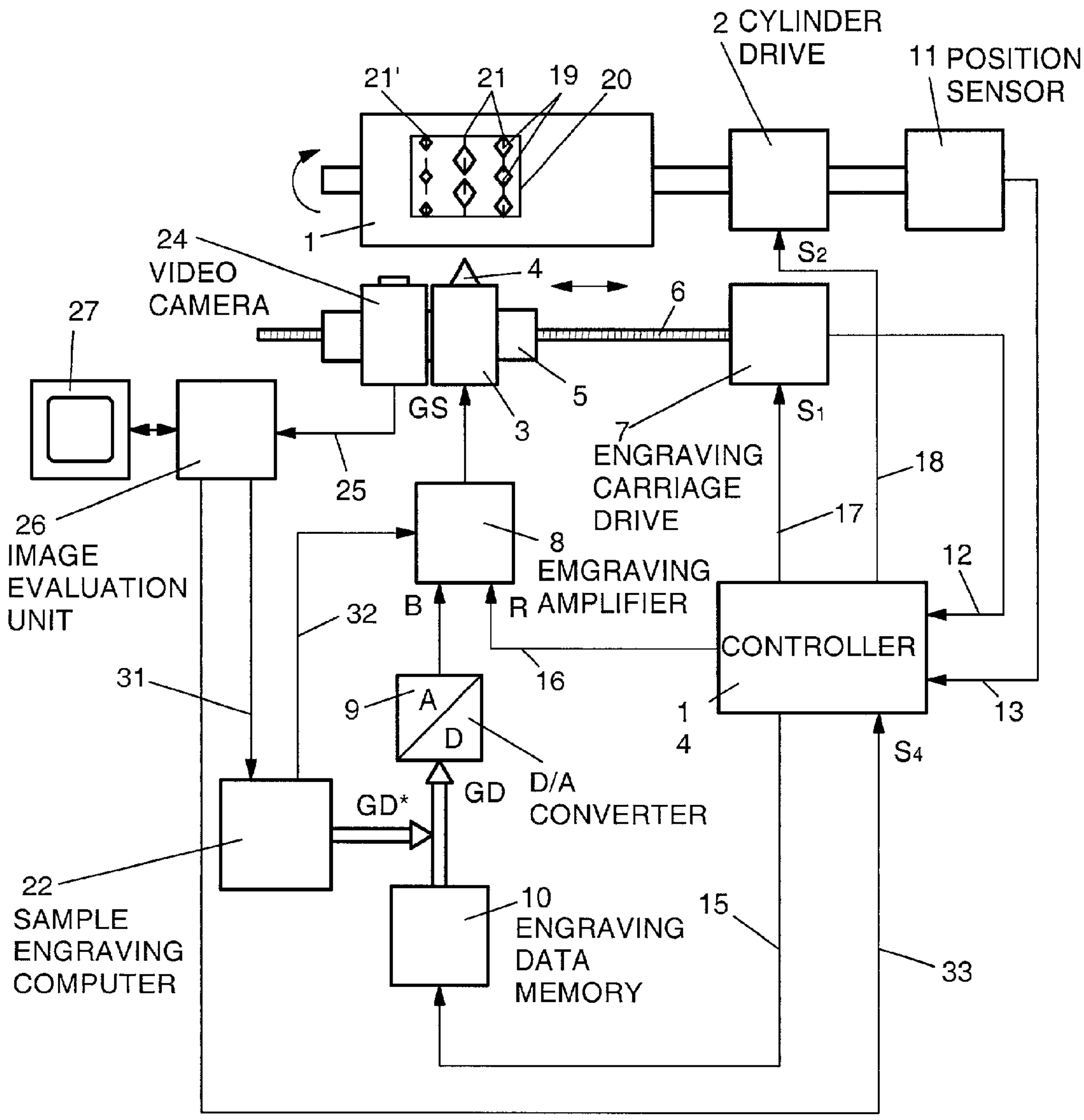
FIG. 11 shows schematically an electronic engraving machine for engraving printing forms with a second exemplary embodiment for the arrangement of a measuring instruments for measuring engraved sample cups.

FIG. 11 schematically shows an electronic engraving machine for engraving printing forms with a second exemplary embodiment for a measuring device for measuring engraved sample cups 19.

In this exemplary embodiment, the video camera 24—differing from what is shown in FIG. 1—is not arranged on a separate measurement carriage 23 but on the engraving carriage 7 next to the engraving element 3 with a structurally conditioned axial spacing B from the engraving stylus 4 of the engraving element 3. The video image 35 of the engraved sample cups 19 is picked up, for example, via a lightguide cable whose light entry face is arranged in a plane proceeding perpendicular to the axial direction and through the tip of the engraving stylus 4 of the engraving element 3. Alternatively thereto, the video image 35 of the engraved sample cups 19 can also be directly registered with the video camera 24. In this case, the video camera 24 mounted on the engraving carriage 5 is first shifted by the axial distance B onto the predetermined measurement position in the sample engraving region 20 with the engraving carriage drive 7 after engraving the sample cups 19. Subsequently, the position errors $\Delta x_M$ and $\Delta y_M$ are measured and corrected and the engraved sample cups 19 are measured.

Figure 12:
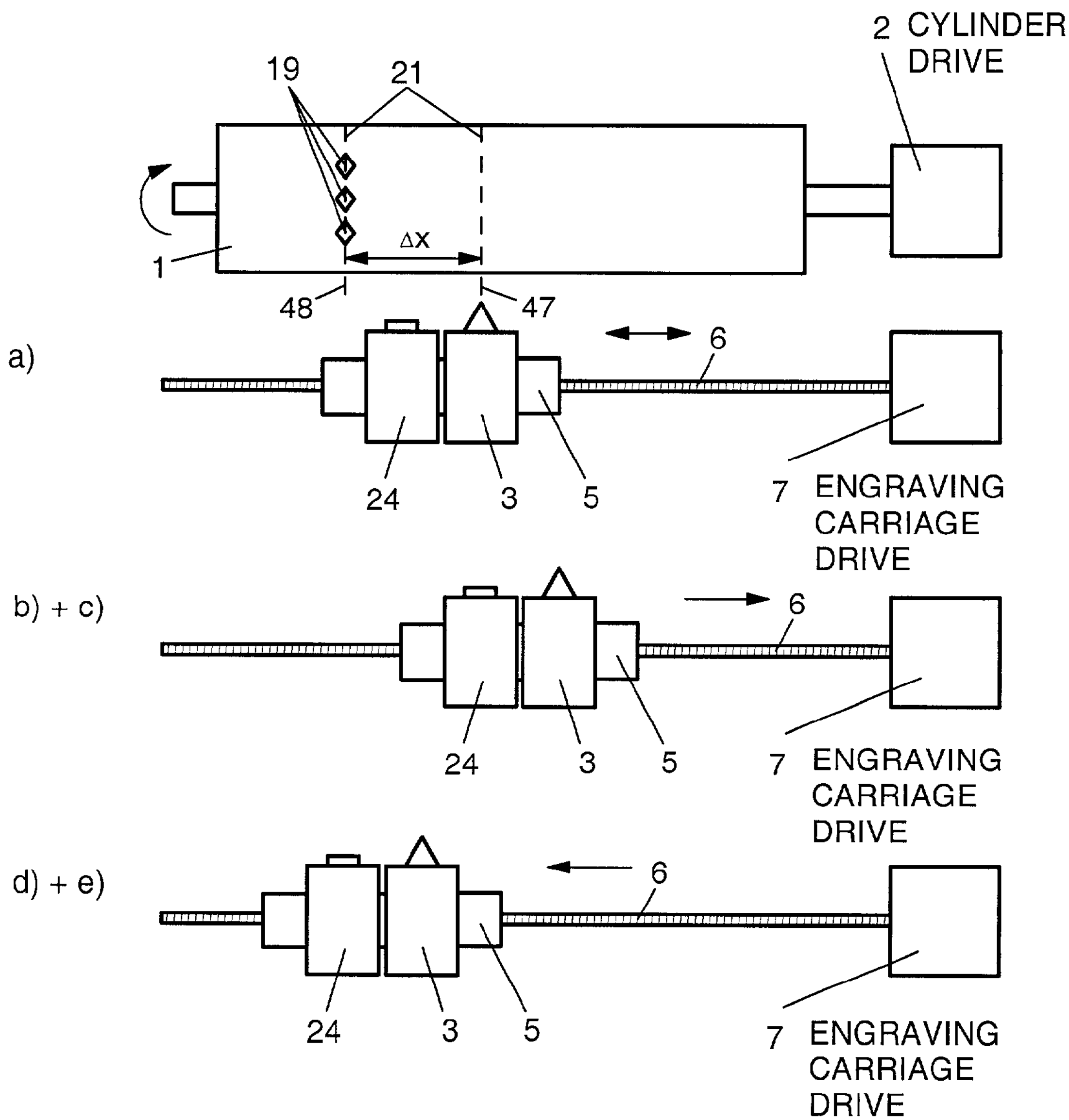
FIG. 12 shows the method sequence given an engraving machine.

FIG. 12, in summary, schematically shows the work execution at an engraving machine, whereby it is assumed that the video camera 24 is mounted next to the engraving element 3 on the engraving carriage 5 according to the exemplary embodiment according to FIG. 11.

a) Displacing the engraving element 3 with the engraving carriage 5 onto a predetermined, axial rated position 47 of an engraving line 21 to be engraved and engraving of sample cups 19 on an engraving line 21 in an axial actual position 48 that, due to an axial position error Δx, deviates from the rated position 47, according to method steps [A] and [B].
b) Positioning the video camera 24 to the predetermined measurement position 47, which coincides with the predetermined rated position 47 of the engraving line 21, by displacing the engraving carriage 5 according to method step [C].
c) Measuring the position error Δx of the video camera 24 in the predetermined measurement position 47 according to method step [D].
d) Correction of the position error Δx of the video camera 24 by displacing the engraving carriage 5 into a new measurement position 48 according to method step [E] and
e) measuring the engraved sample cups 19 that were engraved on the engraving line 21 in the actual position 48 at the new measurement position 48 of the video camera 24 according to method step [F].

The method can preferably also be utilized in the engraving of a plurality of engraving lanes lying juxtaposed in axial direction on a printing cylinder with a respectively allocated engraving element and in what is referred to as the twin mode of the engraving machine.

When engraving a plurality of engraving lanes on a printing cylinder 1 with a respectively allocated engraving element 3, a separate sample engraving must be implemented for each engraving element 3. For measuring the sample engravings, let the engraving machine be equipped with the displaceable measurement carriage 23 with the video camera 24 according to the exemplary embodiment of FIG. 1. For measuring the individual sample engravings in each engraving lane, the video camera 24 is respectively axially displaced onto the individual measurement positions by the width of an engraving lane. In this case, the above-explained method steps [A] through [F] are implemented in every measurement position. Of course, a video camera according to the exemplary embodiment of FIG. 11 can also be allocated to each engraving element 3.

In what is referred to as the twin mode of an engraving machine, two printing cylinders 1, 1* are mechanically coupled to one another, these being engraved with a respective engraving element 3, 3*. The engraving element 3, 3* are mounted on the shared engraving carriage 5 with a fixed spacing from one another, said engraving carriage 5 moving axially along both printing cylinders 1, 1*. A sampling engraving is engraved on the appertaining printing cylinder 1, 1* with each engraving element 3, 3*. For measuring the sample engravings, let the engraving element 3, 3* comprise a video camera 24, 24* on the engraving carriage 5 next to each engraving element 3, 3* according to the exemplary embodiment of FIG. 11. A modified work sequence derives in this case.

Figure 13:
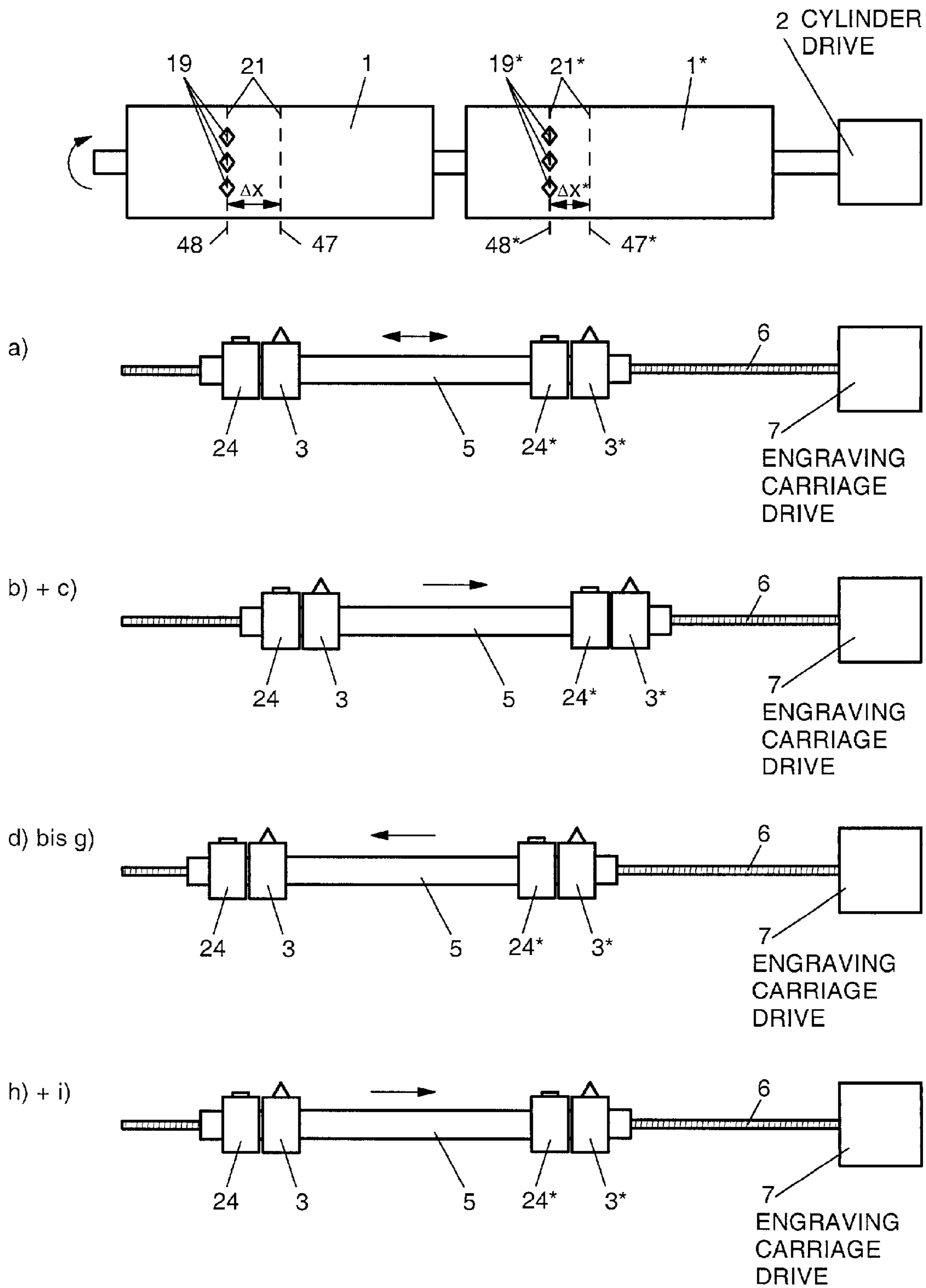
FIG. 13 shows the method sequence given an engraving machine working in twin mode.

FIG. 13 schematically shows the modified work sequence at an engraving machine working in twin mode, whereby it is assumed that a respective video camera 24, 24* is mounted on the shared engraving carriage 5 next to the engraving element 3, 3* according to the exemplary embodiment of FIG. 11.

a) Displacing the engraving elements 3, 3* with the shared engraving carriage 5 onto predetermined, axial rated position 47, 47* of engraving lines 21, 21* to be engraved and engraving sample cups 19, 19* on the engraving lines 21, 21* in axial actual positions 48, 48* that deviate from the rated positions 47, 47* due to axial position errors Δx and Δx*, according to method steps [A] and [B].
b) Positioning the first video camera 24 to a predetermined, first measurement position 47 that coincides with the predetermined, first rated position 47 of an engraving line 21 by displacing the shared engraving carriage 5 according to method step [C].
c) Measuring the position error Δx of the first video camera 24 in the predetermined, first measurement position 47 according to method step [D].
d) Correcting the measured position error Δx of the first video camera 24 by displacing the shared engraving carriage 5 into a new first measurement position 48 according to method step [E].

e) Measuring the geometry values of the sample cups 19 engraved on the first printing cylinder 1 that were engraved on the engraving line 21 in the first actual position 48 at the new, first measurement position 50 of the first video camera 240 according to method step [F].

f) Measuring the position error $\Delta x^*$ of the second video camera 24* in the momentary position of the shared engraving carriage 5 according to method step [D].

g) Calculating a new position error $\Delta x^*_{new}$ for the second video camera 24*.

h) Correcting the calculated position error $\Delta x^*_{new}$ of the second video camera 24* into a new, second measurement position 48* by displacing the shared engraving carriage 5 according to method step [E], and i) measuring the geometry values of the sample cups 19 engraved on the second printing cylinder 1* that were engraved on the engraving line 21* in the second actual position 48* at the new, second measurement position 50* of the second video camera 24* according to method step [F].

Although only a preferred embodiment has been shown, other related embodiments may be suggested by those skilled in the art. Also, various minor modifications might be suggested by those skilled in the art, and it should be understood that it is my wish to embody within the scope of the patent warranted hereon all such other embodiments and modifications as reasonably and properly come within the scope of my contribution to the art.

What is claimed is:

1. A method for generating and evaluating a sample cut in an electronic engraving machine for engraving printing cylinders for rotogravure, comprising the steps of:

forming an engraving control signal for driving an engraving stylus of an engraving element from engraving data which represent hues to be engraved between "light" and "dark" and a periodic raster signal for generating an engraving raster;

with the engraving stylus engraving a sequence of cups arranged in the engraving raster into the printing cylinder engraving line by engraving line, geometry values of said cups determining the engraved hues;

engraving sample cups for predetermined hues before actual engraving;

positioning a video camera to a predetermined, axial measurement position and registering a video image of the sample cups with the video camera;

selecting at least one of the engraved sample cups;

identifying a positional deviation of a measurement location of the selected sample cup from a reference location in the video image as a position error;

correcting the identified position error by at least one of axial displacement of the video camera into a new measurement position and turning the printing cylinder such that the measurement location of the selected sample cup lies at least in a region of the reference location of the video image;

subsequently measuring geometry values of at least the selected sample cup and comparing them to geometry values of the predetermined hues; and calibrating the engraving control signal dependent on a result of the comparison so that the engraved hues correspond to the predetermined hues.

2. The method according to claim 1 wherein a sample cup representing a mid-hue between "light" and "dark" is selected.

3. The method according to claim 1 wherein the measurement location is an area mid-point of the selected sample cup.

4. The method according to claim 1 wherein the measurement location is a mid-point of one of the transverse diagonals and of the longitudinal diagonals of the selected sample cup.

5. The method according to claim 1 wherein the measurement location is a mid-point of one of a pilot cut and of a web of the selected sample cup.

6. The method according to claim 1 wherein the reference location for determining the positional deviation of the selected sample cup in the video image lies in a middle of the image.

7. The method according to claim 1 wherein the reference location for determining the positional deviation of the selected sample cup in the video image is a coordinate origin of a measurement coordinate system in the video image.

8. The method according to claim 1 wherein the video image is subdivided into pixels; and a position of the pixels in the video image is defined by coordinates of a video coordinate system allocated to the video image.

9. The method according to claim 1 wherein the video image is subdivided into pixels;

a measurement field displaceable across the video image is generated;

the measurement field comprises at least one measurement line with a plurality of pixels whose position in the video image is defined by coordinates of a video coordinate system; and a length of a measurement distance in the video image is determined as a plurality of pixels of the measurement line.

10. The method according to claim 9 wherein the measurement field is designed stripe-shaped.

11. The method according to claim 9 wherein the measurement field can be arbitrarily oriented in the video image.

12. The method according to claim 9 wherein the measurement distance corresponds to the spacing of two contours belonging to a sample cup from one another.

13. The method according to claim 9 wherein contours of the sample cup are recognized by an automatic evaluation of the video image.

14. The method according to claim 13 wherein contours of the sample cup are recognized by means of at least one measurement line of the measurement field.

15. The method according to claim 14 wherein every pixel of the video image has a video datum allocated to it that identifies whether a corresponding pixel is a component part of the sample cup or not;

video data of respectively two successive pixels of the measurement line of the measurement field are investigated for a change; and an identified change of the video data is recognized as a contour.

16. The method according to claim 1 wherein the selected sample cup is automatically recognized in the video image with assistance of a displaceable measurement field.

17. The method according to claim 16 wherein a size of a cup area of the selected sample cup is prescribed;

the measurement field is defined having a size corresponding at least to the cup area of the selected sample cup;

the measurement field is shifted across the video image from sample cup to sample cup;

the cup area of the respective sample cup is measured in every position of the measurement field and compared to the prescribed cup area; and a sample cup is recognized as selected sample cup given at least approximate area coincidence.

18. The method according to claim 17 wherein the size of the cup area of the selected sample cup is prescribed as a plurality of pixels;

the measurement field comprises a plurality of measurement lines aligned parallel to one another;

the cup area of a sample cup is determined by adding up pixels in the individual measurement lines that fall into the cup area; and the prescribed plurality of pixels is compared to the measured plurality of pixels in the area comparison.

19. The method according to claim 1 wherein a measurement location of the selected sample cup and its position in the video image is automatically determined with the assistance of a displaceable measurement field.

20. The method according to claim 19 wherein the measurement location is an area mid-point of the selected sample cup; and one of a transverse diagonal and a longitudinal diagonal of the selected sample cup is measured with the measurement field as a measurement distance, whereby the area mid-point derives as one of half of the transverse diagonal and half of the longitudinal diagonal.

21. The method according to claim 1 wherein two printing cylinders coupled to one another are engraved with a respective engraving element;

the engraving elements are arranged on a shared engraving carriage;

a video camera is allocated to each engraving element;

the first video camera is positioned to a predetermined, first measurement position;

an axial position error of the first video camera is measured in the predetermined, first measurement position;

the measured axial position error of the first video camera is corrected by displacing the shared engraving carriage into a new, first measurement position;

geometry values of the sample cups engraved on the first printing cylinder are measured at the new, first measurement position of the first video camera;

an axial position error of the second video camera in a momentary position of the shared engraving carriage is measured;

a new axial position error is calculated for the second video camera;

the calculated, axial position error of the second video camera is corrected by displacing the shared engraving carriage into a new, second measurement position; and geometry values of the sample cups engraved on the second printing cylinder are measured at the new, first measurement position of the first video camera.

22. The method according to claim 1 wherein sample cups for the hues “light”, “dark” and at least one “mid-hue” are engraved in the sample engraving.

23. The method according to claim 1 wherein the sample cups for the hues “light”, “dark” and “mid-hue” are respectively engraved on neighboring engraving lines.

24. The method according to claim 1 wherein at least one sample cup is engraved on each engraving line.

25. The method according to claim 1 wherein the geometry values to be measured are at least one of transverse diagonals, longitudinal diagonals, pilot cuts, web widths and cup areas of the engraved sample cups.

26. The method according to claim 1 wherein a stripe-shaped measurement field is provided having its longitudinal expanse arranged transversely, to a path of the web in the measurement coordinate system for measuring web widths.

27. The method according to at least one of the claims 1 wherein a measurement field is provided having a plurality of measurement lines arranged parallel to one another;

measured results achieved with the individual measurement lines are compared to one another; and for enhancing measuring dependability, a measured result of a measurement line is forwarded only given agreement of the measured results compared to one another.

28. The method according to claim 1 wherein a measurement field is provided having a plurality of measurement lines arranged parallel to one another;

measured results achieved with the individual measurement lines are subjected to an extreme value selection; and only one of a greatest and smallest measured result is forwarded.

29. The method according to claim 1 wherein a measurement field is employed both for measurement of positional deviation of the selected sample cup as well as for measurement of geometry values of the sample cups.

30. A method for generating and evaluating a sample cut in an electronic engraving machine for engraving printing cylinders for rotogravure, comprising the steps of:

forming an engraving control signal for driving an engraving element from engraving data which represent hues to be engraved between “light” and “dark” and a periodic raster signal for generating an engraving raster;

with the engraving stylus engraving a sequence of cups arranged in the engraving raster into the printing cylinder engraving line by engraving line, geometry values of said cups determining the engraved hues;

engraving sample cups for predetermined hues before actual engraving;

positioning a video camera to a predetermined, axial measurement position and registering a video image of the sample cups with the video camera;

selecting at least one of the engraved sample cups;

identifying a positional deviation of a measurement location of the selected sample cup from a reference location in the video image as a position error;

correcting the identified position error by moving at least one of the video camera and the printing cylinder such that the measurement location of the selected sample cup lies at least in a region of the reference location of the video image;

subsequently measuring geometry values of at least the selected sample cup and comparing them to geometry values of the predetermined hues; and calibrating the engraving control signal dependent on a result of the comparison so that the engraved hues correspond to the predetermined hues.

* * * * *